US012444524B2

(12) United States Patent
Malinovskiy et al.

(10) Patent No.: US 12,444,524 B2
(45) Date of Patent: Oct. 14, 2025

(54) COMPONENT WITH A WINDING CARRIER AND CORE AND METHOD FOR PRODUCING A COMPONENT

(71) Applicant: TDK Electronics AG, Munich (DE)

(72) Inventors: Vladimir Malinovskiy, Munich (DE); Matthias Haubner, Munich (DE)

(73) Assignee: TDK Electronics AG, Munich (DE)

( * ) Notice: Subject to any disclaimer, the term of this patent is extended or adjusted under 35 U.S.C. 154(b) by 659 days.

(21) Appl. No.: 17/638,631

(22) PCT Filed: Mar. 11, 2021

(86) PCT No.: PCT/EP2021/056161

§ 371 (c)(1),
(2) Date: Feb. 25, 2022

(87) PCT Pub. No.: WO2021/180837

PCT Pub. Date: Sep. 16, 2021

(65) Prior Publication Data

US 2022/0301755 A1 Sep. 22, 2022

(30) Foreign Application Priority Data

Mar. 13, 2020 (DE) ......................... 102020106982.0

(51) Int. Cl.

| | |
|---|---|
| ***H01F 5/02*** | (2006.01) |
| ***H01F 5/04*** | (2006.01) |
| ***H01F 27/26*** | (2006.01) |
| ***H01F 27/28*** | (2006.01) |
| ***H01F 27/32*** | (2006.01) |

(52) U.S. Cl.
CPC ............ *H01F 5/02* (2013.01); *H01F 27/266* (2013.01); *H01F 27/2828* (2013.01); *H01F 27/325* (2013.01); *H01F 2005/046* (2013.01)

(58) Field of Classification Search
CPC ...... H01F 5/02; H01F 27/266; H01F 27/2828; H01F 27/325; H01F 2005/046
See application file for complete search history.

(56) References Cited

U.S. PATENT DOCUMENTS 6,154,113 A 11/2000 Murai
6,344,787 B1 2/2002 McGrane et al.
(Continued)

FOREIGN PATENT DOCUMENTS

CN 202758705 U 2/2013
CN 104282419 A 1/2015
(Continued)

OTHER PUBLICATIONS

Examination Report in Japanese Patent Application No. 2022-514997, dated May 9, 2023, in Japanese (7 pages).
(Continued)

*Primary Examiner* — Malcolm Barnes
(74) *Attorney, Agent, or Firm* — NIXON PEABODY LLP

(57) ABSTRACT

A component having a winding carrier, at least one winding, a magnetic core and first and second connections. The winding carrier surrounds at least regions of the core in such a way that an insulation section between the connections along an underside of the component cannot be bypassed via the core. In particular, an underside of the winding carrier is designed to be closed.

18 Claims, 10 Drawing Sheets

(56) References Cited

U.S. PATENT DOCUMENTS

Figure 1A:
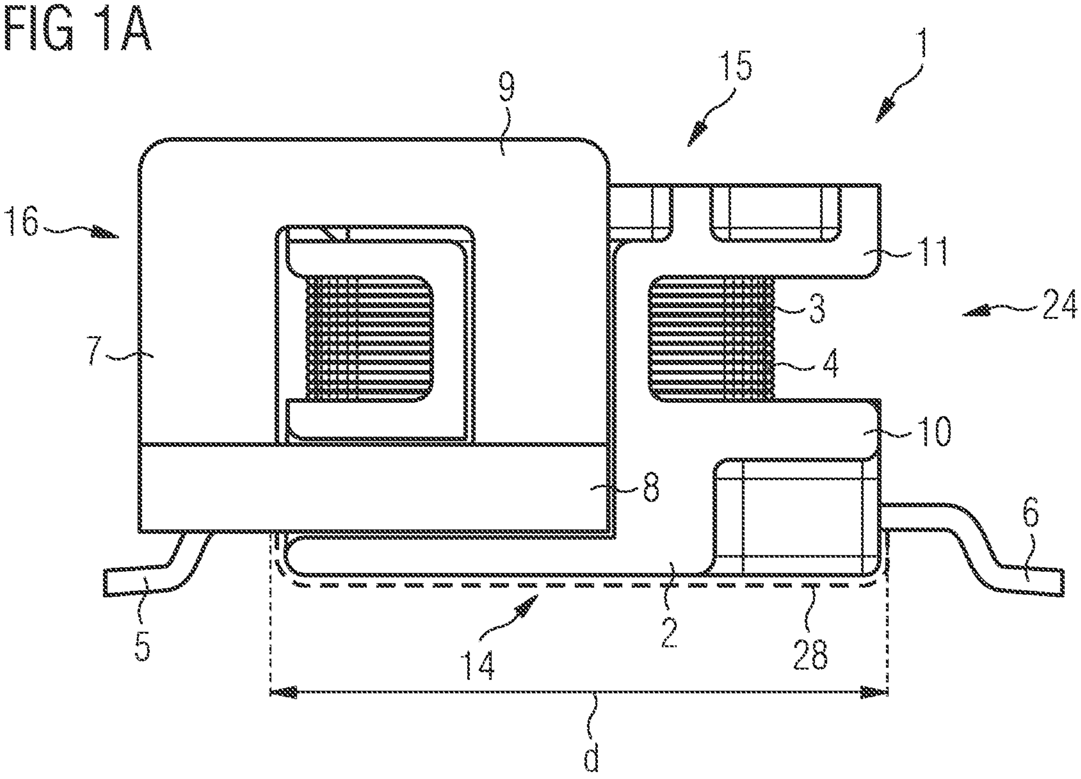

| | | | | |
|---|---|---|---|---|
| 7,365,630 | B1 * | 4/2008 | Yang | H01F 27/306 336/212 |
| 9,646,755 | B2 | 5/2017 | Lint | |
| 2013/0049913 | A1 | 2/2013 | Kobayashi | |
| 2014/0159852 | A1 * | 6/2014 | Miura | H01F 27/02 336/208 |
| 2019/0080836 | A1 * | 3/2019 | Yasuda | H01F 27/29 |
| 2019/0139690 | A1 * | 5/2019 | Cheng | H01F 27/2823 |
| 2022/0223334 | A1 | 7/2022 | Hofbauer | |

FOREIGN PATENT DOCUMENTS

| | | | | |
|---|---|---|---|---|
| CN | 204348499 | U | | 5/2015 |
| CN | 204926996 | U | | 12/2015 |
| DE | 19928567 | A1 | | 12/1999 |
| EP | 0138014 | A1 | | 4/1985 |
| JP | 1996-186035 | A | | 7/1996 |
| JP | H08186035 | A | | 7/1996 |
| JP | H10149932 | A | * | 6/1998 |
| JP | 1999-219827 | A | | 8/1999 |
| JP | H11219827 | A | | 8/1999 |
| JP | 2007035690 | A | * | 2/2007 |
| JP | 2019050280 | A | | 3/2019 |
| JP | 2022537993 | A | | 8/2022 |
| KR | 2002-0033716 | A | | 5/2002 |
| WO | WO 2013/027447 | A1 | | 2/2013 |
| WO | WO 2020/254480 | A1 | | 12/2020 |

OTHER PUBLICATIONS

International Search Report and Written Opinion of International Searching Authority corresponding to International Patent Application No. PCT/EP2021/056161, with English translation of the Search Report, mailed Jun. 21, 2021 (16 pages).

Examination Report in Japanese Patent Application No. 2022-514997, dated Aug. 27, 2024, in Japanese (7 pages).

Examination Report in related Chinese Patent Application No. 202180005232.4, dated Jun. 6, 2025, in Chinese (8 pages).

* cited by examiner

COMPONENT WITH A WINDING CARRIER AND CORE AND METHOD FOR PRODUCING A COMPONENT

CROSS-REFERENCE TO RELATED APPLICATIONS

This application is a U.S. National Stage of International Application No. PCT/EP2021/056161, filed Mar. 11, 2021, which claims the benefit of German Patent Application No. 102020106982.0, filed Mar. 13, 2020, both of which are incorporated herein by reference in their entireties.

The present invention relates to a device comprising a winding carrier with a winding and a magnetic core. It is, for example, a transformer. It may also be another device with a magnetic core.

In the case of electrical devices, such as a transformer, for example, prescribed insulation distances between electrical terminals must be observed, in particular in accordance with IEC standards. Therein, the insulation distances, i.e. the shortest possible creepage and/or clearance distances along an insulating material, between the terminals should be sufficiently large. For example, insulation distances must be observed between a terminal on the power supply side and a terminal on the consumer side.

Insulation paths can be bridged by an electrically conductive magnetic core, so that the distances between the terminals must be prolonged accordingly. For example, at operating altitudes above 4 km above sea level, long clearance distances are required. To ensure sufficient insulation paths, the distances from electrical terminals to the core are usually chosen to be appropriately large. This leads to an undesirable increase in the size of the device, especially since the insulation path to be observed and the core size add up.

To prevent insulation paths from being bridged, the core for itself can also be encapsulated in a plastic housing and installed in the device in an insulated manner. It is also known to cast a component, for example a wound toroidal core, as a whole so that only the terminals lead out of the casting. However, this has disadvantages in terms of cost and component size.

From the document U.S. Pat. No. 9,646,755 B2, it is also known to insert a coil with core together into a housing that is open on one side in order to insulate the core from terminal pins and in this way increase the clearance distance. The wire ends are then led from the winding to the pins via an outer side of the housing.

It is an object of the present invention to specify an improved device and a method for producing a device.

According to a first aspect of the present invention, a device comprises a winding carrier and at least one winding arranged around the winding carrier. The winding may be, for example, a winding of a wire, such as a round or flat wire, or may be also a printed winding. The winding carrier is in particular formed from an electrically insulating material. For example, it is a plastic material. The winding carrier is used in particular for positioning the winding. In particular, the winding is wound directly onto a region of the winding carrier. The winding carrier has, for example, a single-piece design. In particular, the winding carrier can be produced by injection molding.

In addition, the device comprises a magnetic core. The core comprises, for example, a ferrite material. In particular, the magnetic core encloses a region of the winding. For example, the core forms a closed magnetic circuit. The core may comprise a plurality of core portions. For example, the core comprises an I-shaped core part and a U-shaped core part. Other core shapes are also possible. For example, the core portions are glued to each other.

The device comprises at least one first electrical terminal and at least one second electrical terminal. The device is configured, for example, as a transformer. The first electrical terminal is formed, for example, on the primary side and the second terminal is formed on the secondary side. The first terminal may in particular be a terminal on the power supply side and the second terminal may be a terminal on the consumer side.

The device may have a plurality of first terminals and a plurality of second terminals. The terminals are, for example, in the form of pins. For example, the first terminals are arranged side by side in a first row and the second terminals are arranged side by side in a second row. The first terminals are electrically connected in pairs, for example, with one or more first windings and the second terminals are electrically connected in pairs with one or more second windings. The terminals are arranged, for example, in the region of a lower side on the winding carrier. The first terminals and the second terminals are arranged, for example, at opposite edges of the winding carrier. The terminals may be directly attached to the winding carrier. For example, the terminals are co-injection molded in the injection molded process.

The winding carrier is designed as an at least partial insulation of the core. Additional insulation of the core is therefore not necessary. In particular, no separate casting or separate housing is required for the core.

In particular, the winding carrier encloses the core at least partially in such a way that an insulation path between the terminals along a lower side of the device comprises no bridging by the core. The insulation path here is the shortest clearance and/or creepage path. For example, the minimum creepage distance thus does not run to the core, but only along the winding carrier.

For example, the core is encased by the winding carrier such that the sum of the insulation path between the first terminals and the core and the insulation path between the second terminals and the core is at least as large as the geometric distance between the first terminals and the second terminals.

Thus, the winding carrier insulates the core from the terminals such that the insulation paths between the terminals are not shortened by the presence of the core. By insulating the core, the component size can be reduced. For example, it is sufficient to arrange the terminals at a distance from each other equal to the minimum insulation distance. The component size can be reduced to a minimum without having to take into account a bridging of insulation paths through the core.

For example, the winding carrier comprises a lower side. The lower side is the mounting side of the winding carrier or device, i.e. the side facing, for example, a printed circuit board on which the winding carrier can be mounted. The first terminals are arranged, for example, with a view on the lower side at a first edge and the second terminals are arranged at an opposite second edge. The winding carrier comprises, for example, no cutout on the lower side in which the core is exposed. In particular, no such cutout is provided in a region laterally bordered by the first and second terminals. In this way, an insulation path between the terminals along the lower side is prevented from comprising a bridging through the core.

However, it is possible that the core beyond the terminals, i.e. leading away from the center of the device, is not encased by the winding carrier. However, this does not then result in bridging of the insulation path between the terminals.

The winding carrier can comprise at least one opening through which the core or core parts of the core can be inserted into the winding carrier. The lower side is free of such an opening, for example. This enables a closed design of the winding carrier at the lower side.

In one embodiment, at least one opening is arranged in a side surface of the winding carrier. The core can thus be inserted laterally into the winding carrier. In addition, the winding carrier may also comprise at least one opening on its upper side. For example, the winding carrier comprises an opening on the side surface and an opening on the upper side. Two core parts can be inserted through the openings. For example, an I-shaped core part is inserted through one of the openings and a U-shaped core part is inserted through the other opening.

In a further embodiment, the winding carrier may comprise only on its upper side one or more openings for insertion of the core. In this way, the side surfaces of the winding carrier can also further insulate the core, since no openings need to be present here. Thus, in the case of multiple core parts, all core parts are inserted into the winding carrier from the upper side. For example, a first core part can first be inserted through the opening on the upper side, then the winding can be applied, and then a second core part can be inserted.

If the openings in the winding carrier are positioned appropriately, the core can be encased by the winding carrier not only on the lower side but also on the side faces. Thus, bridging of insulation paths by the core can be prevented particularly well. For example, the core is completely insulated from the outside by the winding carrier on at least one side face. The core can also be completely insulated from the outside by the winding carrier on two or more side faces.

Depending on the design of the enclosure of the core by the housing, the insulation may be symmetrical or asymmetrical with respect to the terminals. For example, the housing increases an insulation path between the core and one of the terminals. An insulation path between the core and both terminals may also be increased.

For example, the first terminal is arranged on a first side face of the winding carrier and the second terminal is arranged on a second side face of the winding carrier. For example, the core is completely enclosed by the winding carrier on at least one of these side faces. Thus, no bridging of an insulation path through the core can be formed along this side face. It is also possible that the core is not completely encased on the side face, but only to a predominant extent. For example, a smaller portion of the core may be exposed at the upper end of the side face.

The winding carrier may comprise a lead-through along the winding axis. The core may be arranged in this lead-through. Also by the arrangement in the lead-through, the core is insulated from the winding carrier towards the outside, for example towards the side face.

According to an embodiment, at least one of the terminals is arranged recessed. For example, the recessed terminal is attached to a region of a side face of the winding carrier that is recessed inwardly with respect to another region of the side face. In this way, the component dimension can be reduced. The resulting reduced distances between first and second terminals are possible due to the insulation of the core without falling below minimum insulation distances. For example, the spacing between the terminals can be equal to the minimum insulation spacing. Thus, the overall component size can also be limited to a minimum insulation dimension.

According to a further aspect of the present invention, a device comprises a winding carrier and at least one winding of a wire arranged around the winding carrier. The device comprises a magnetic core and at least a first and at least a second electrical terminal, wherein the winding carrier comprises a lower side, wherein the terminals are arranged opposite to each other with respect to the lower side. The winding carrier does not comprise a cutout through which the core is exposed, at least in a region of the lower side laterally bounded by the first and second terminals. The device may comprise all of the structural and functional characteristics of the device previously described.

The closed form of the winding carrier at the lower side insulates the core at the lower side from the terminals, and safety gaps in this region are not bridged by the core.

In accordance with a further aspect of the present invention, a method for producing a device is specified. The device and all components of the device such as winding carrier, terminals and core may be configured as described above.

According to the method, a winding carrier comprising one or more openings on a side face and/or an upper side is provided. A first core part is inserted into the winding carrier through one of the openings. A second core part is inserted into the winding carrier through one of the openings. The second core part may be inserted through the same opening as the first core part or through a different opening. Thus, the core parts are inserted through openings on the side face and/or upper side, but not on the lower side of the winding carrier. Thus, the lower side may be formed without such an opening.

For example, one of the core parts is I-shaped and one of the core parts is U-shaped. After insertion into the winding carrier, the core parts may form a closed magnetic circuit. For example, the core parts are glued to each other after insertion.

In one embodiment, one of the core parts is inserted through an opening on a side face and one of the core parts is inserted through an opening on the upper side. In this case, the winding may be wound onto the winding carrier prior to insertion of both core parts. For example, the winding mandrel is inserted into the winding carrier through one of the openings on the upper side and removed after winding.

In an embodiment, two core parts are inserted through the same opening on the upper side. For example, the first core part is arranged along the winding axis in the winding carrier. For example, after insertion of the first core part, the winding is applied to the winding carrier. For example, the winding is applied around the winding carrier and the core. Subsequently, the second core part is inserted.

If the winding axis is occupied by the first core part before the winding is applied, the winding mandrel cannot be inserted into the winding axis. For example, the winding carrier comprises retaining devices on its outer surface with which the winding carrier can be secured in the winding machine.

The present invention includes several aspects, in particular devices and methods. The embodiments described for one of the aspects apply accordingly to the other aspect.

Moreover, the description of the objects disclosed herein is not limited to the individual specific embodiments. Rather, the features of the individual embodiments may be combined with each other, to the extent technically useful.

In the following, the subject matters described herein will be explained in more detail by means of schematic embodiments.

Figure 1B:
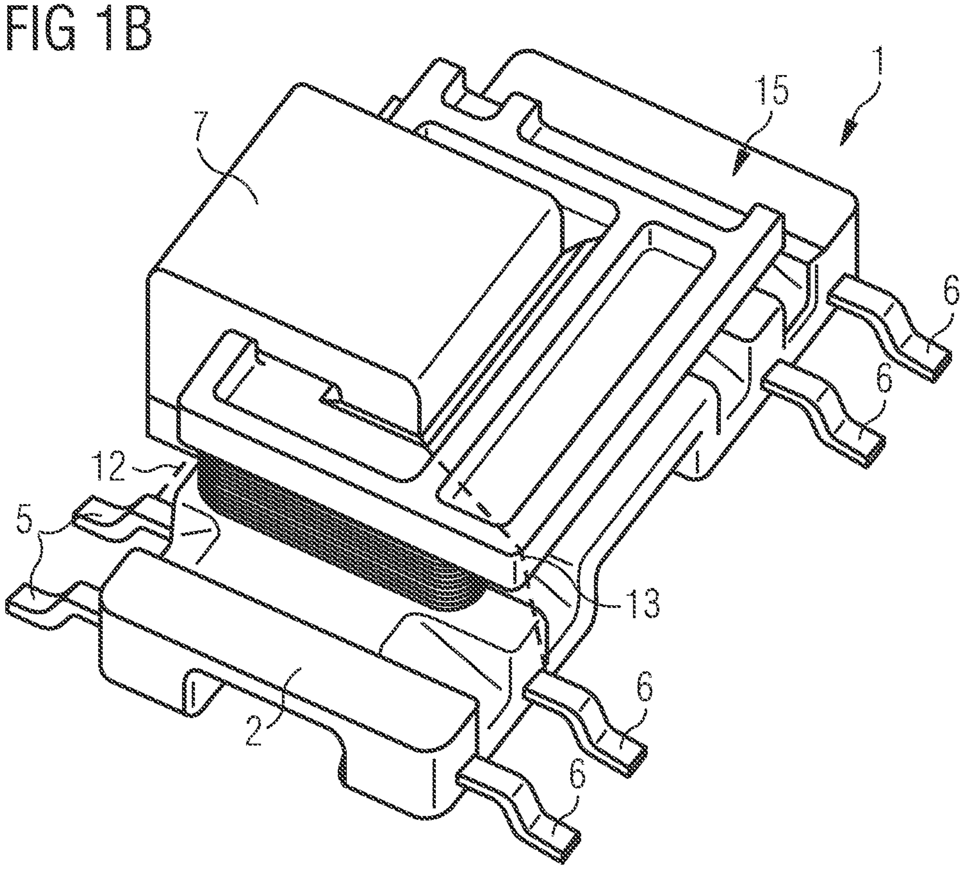
Figure 1C:
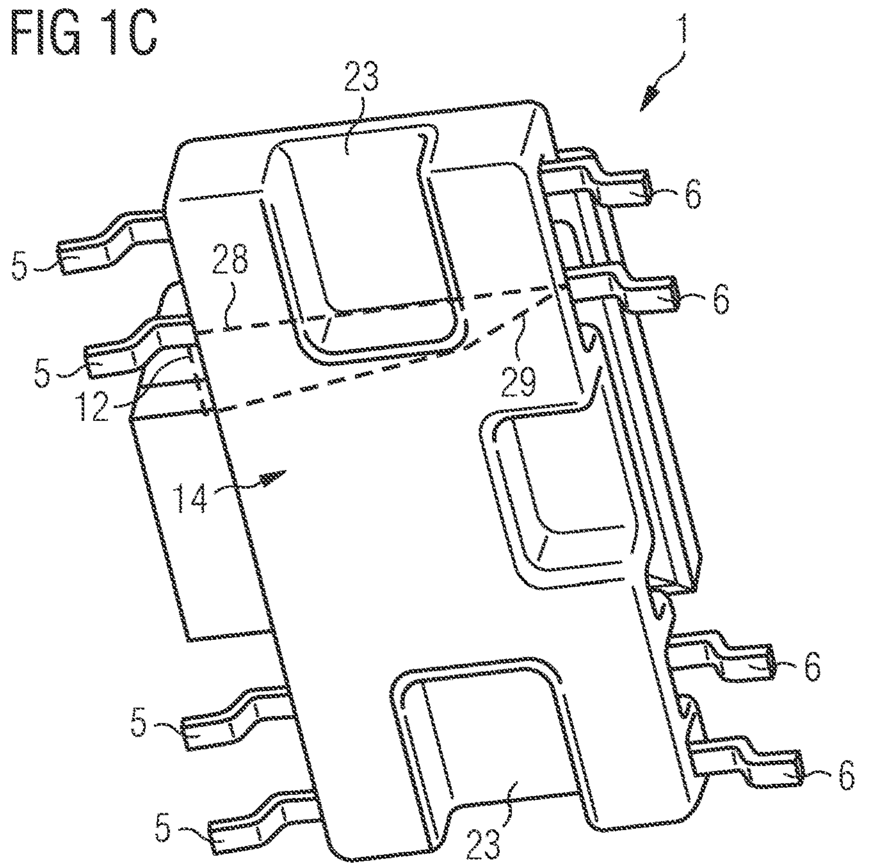
Figure 2:
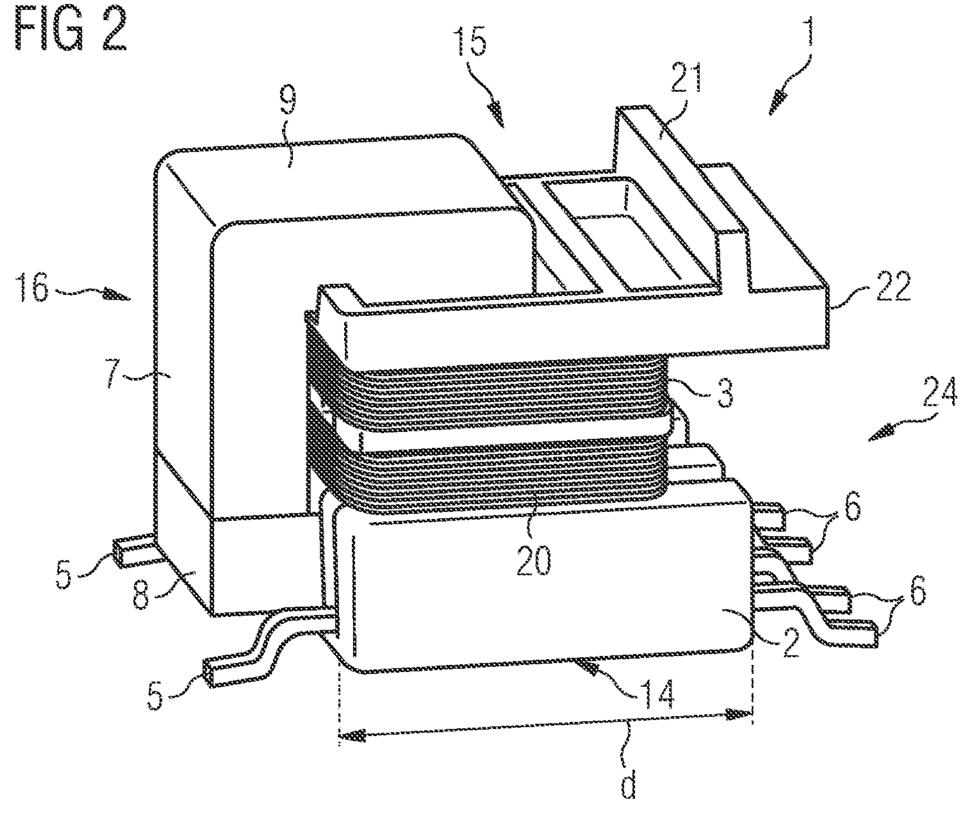
Figure 3A:
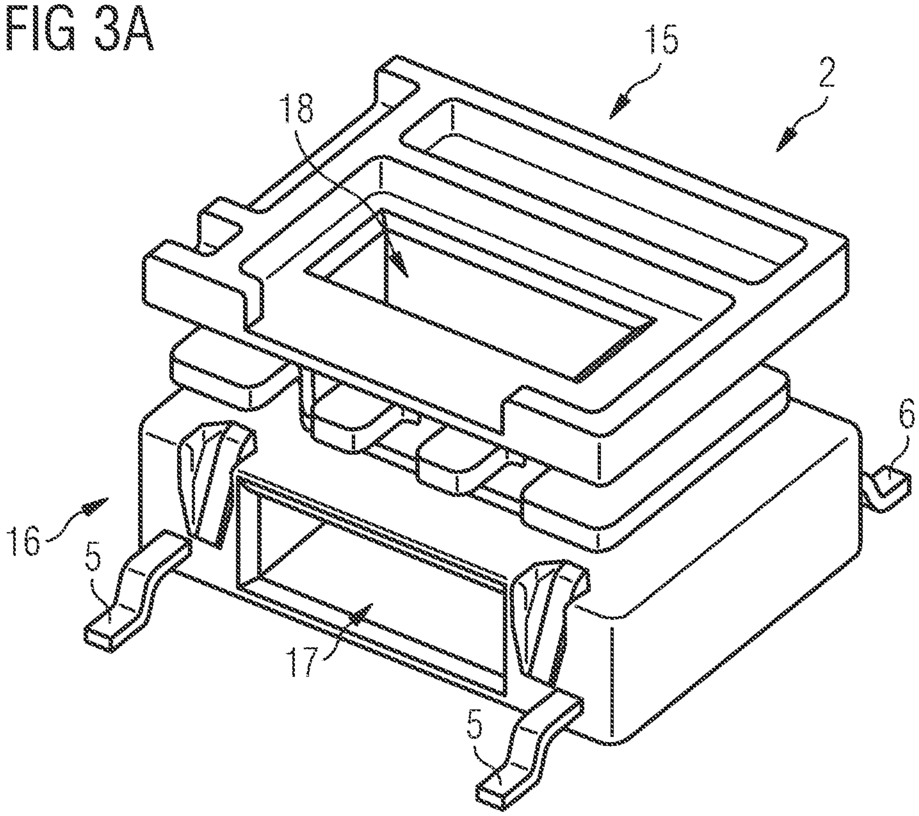
Figure 3B:
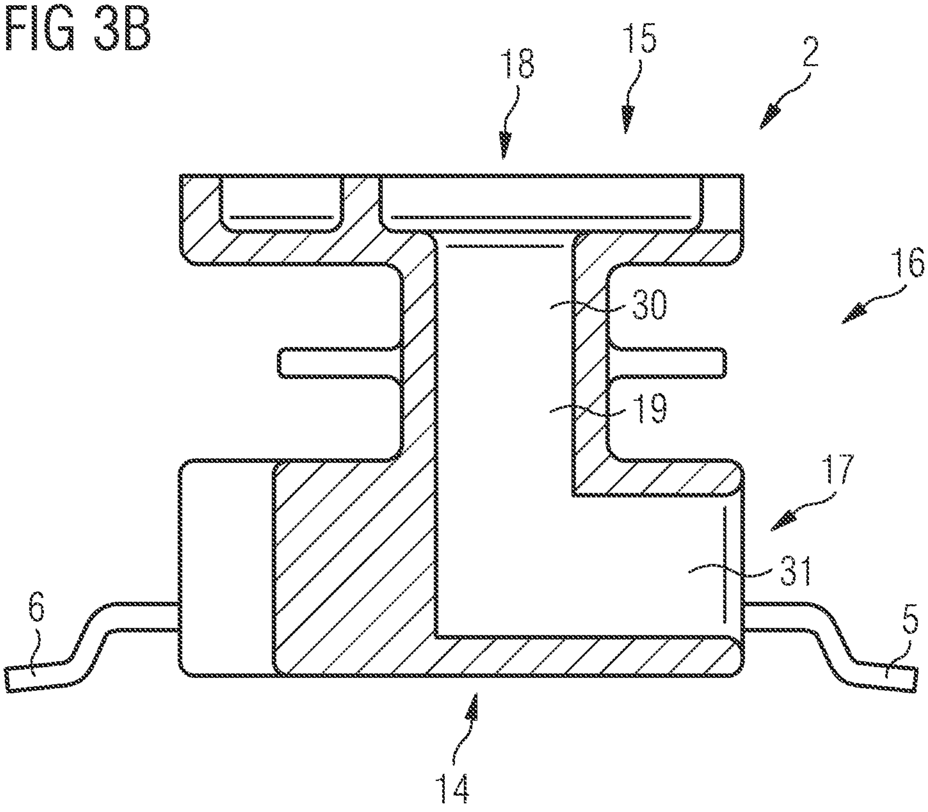
Figure 4A:
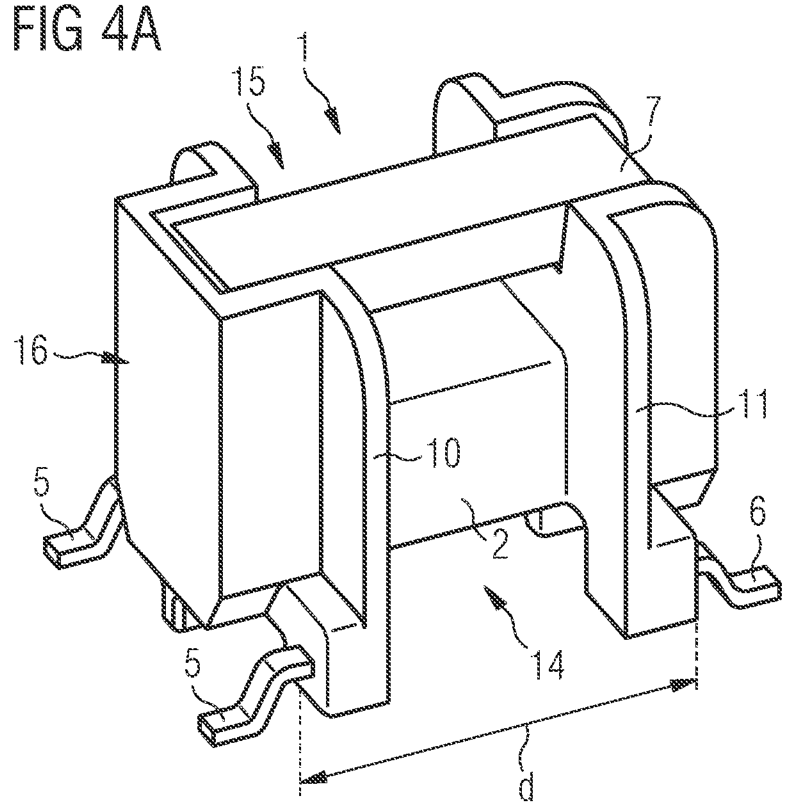
Figure 4B:
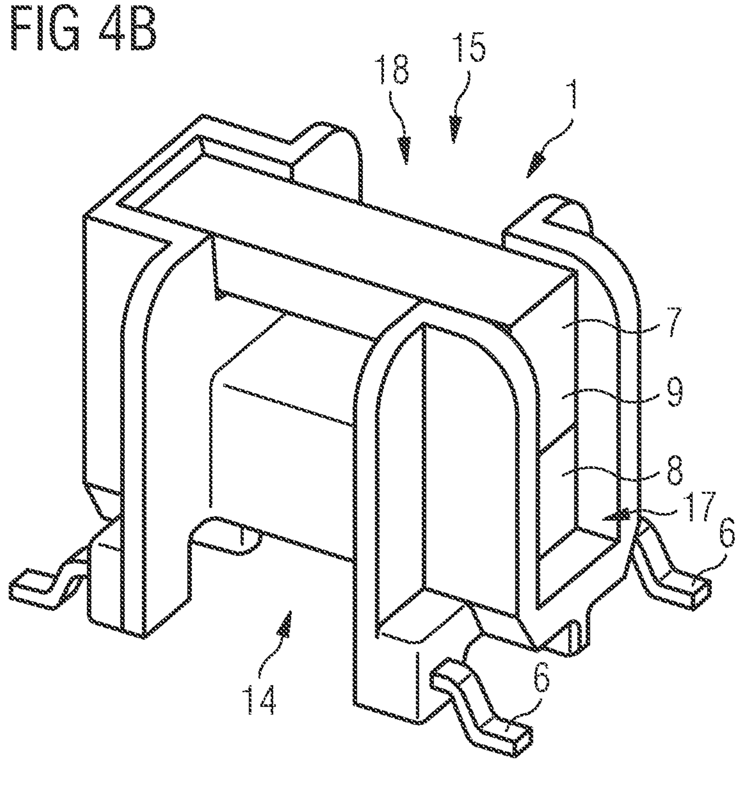
Figure 4C:
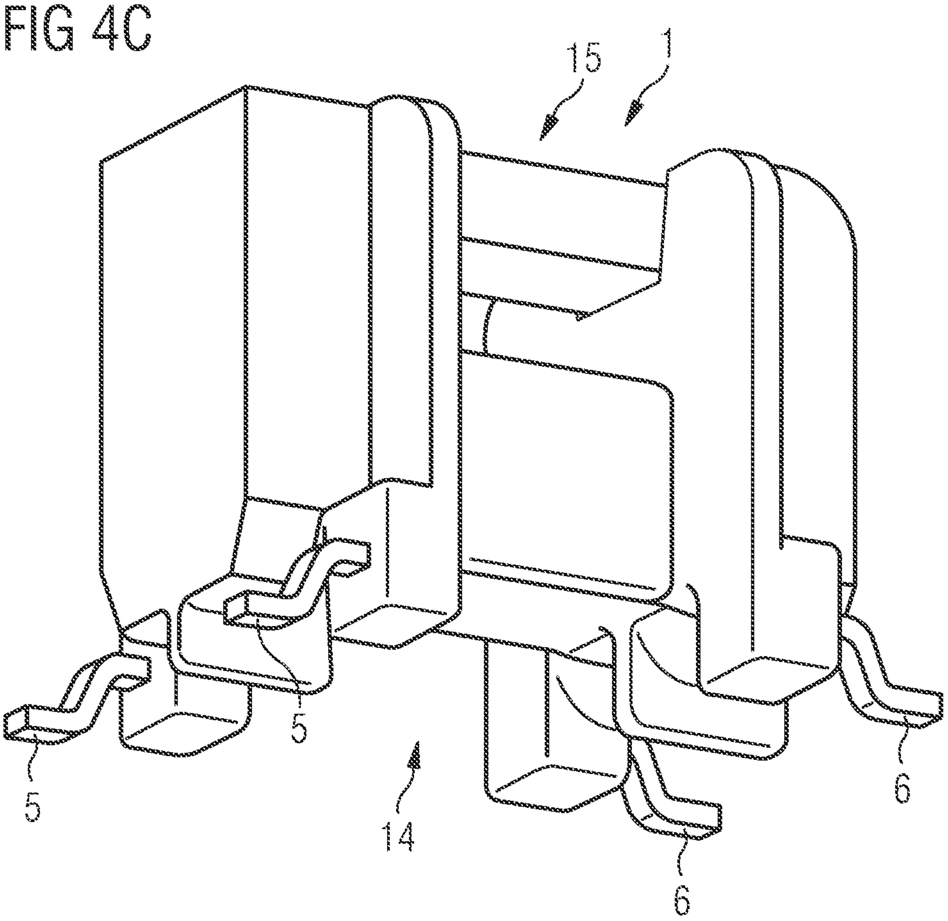
Figure 4D:
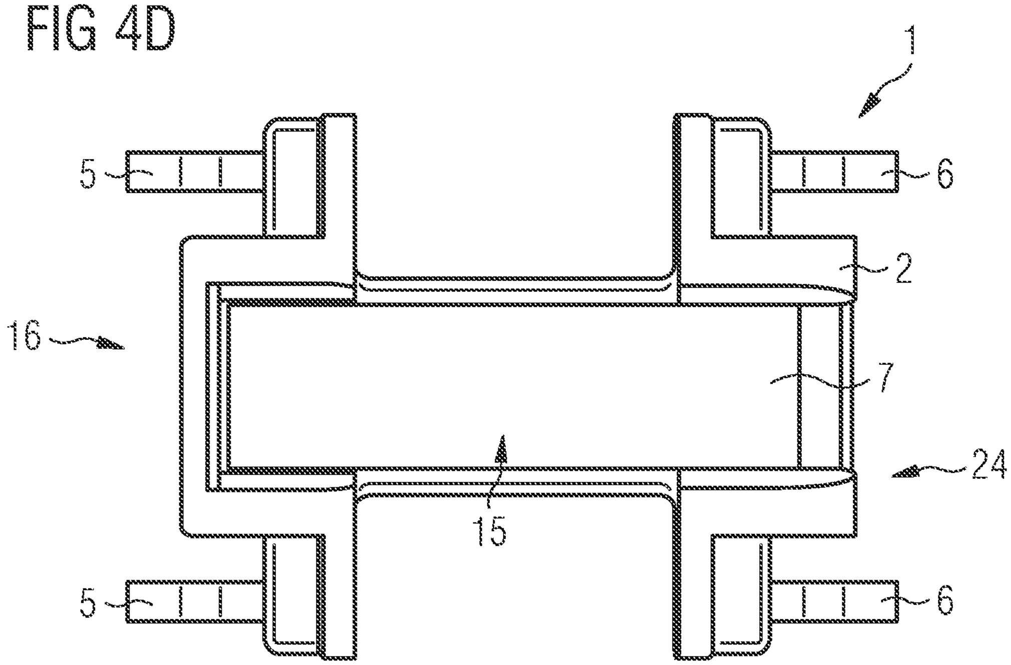
Figure 5:
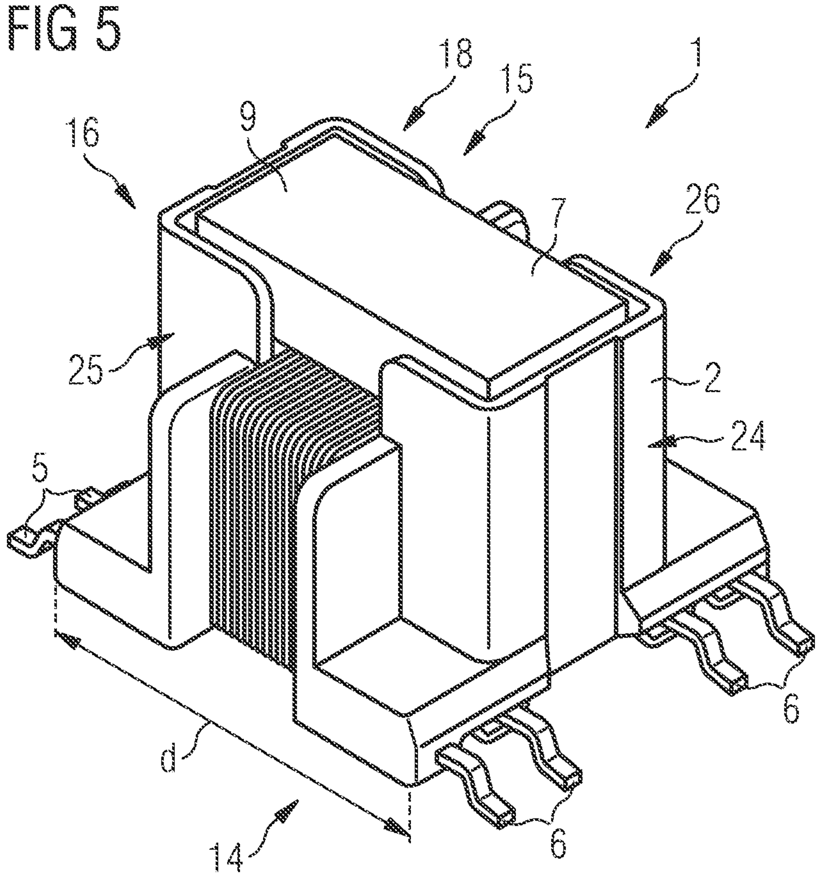
Figure 6A:
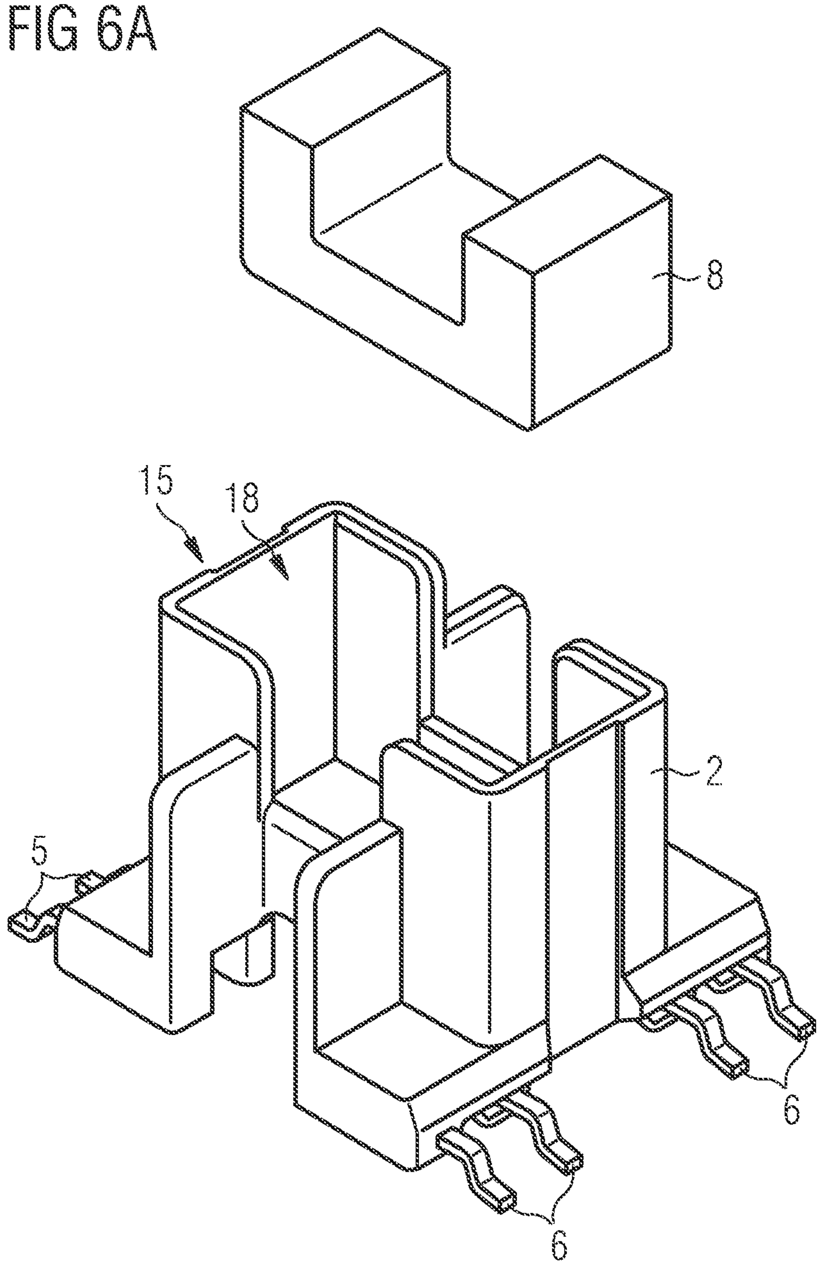
Figure 6B:
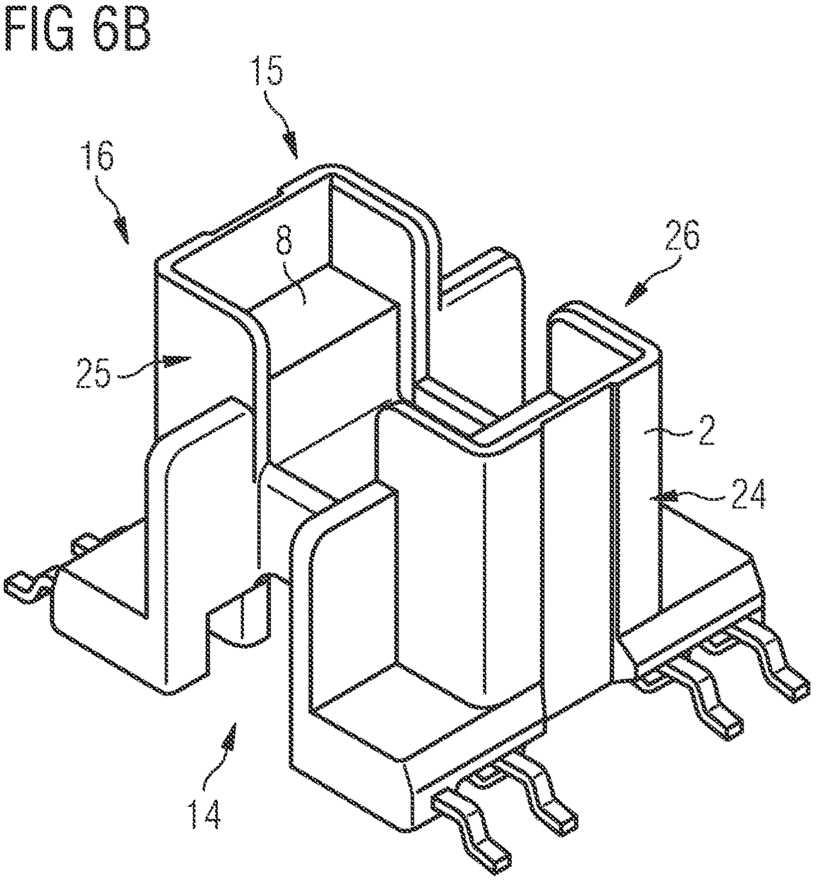
Figure 6C:
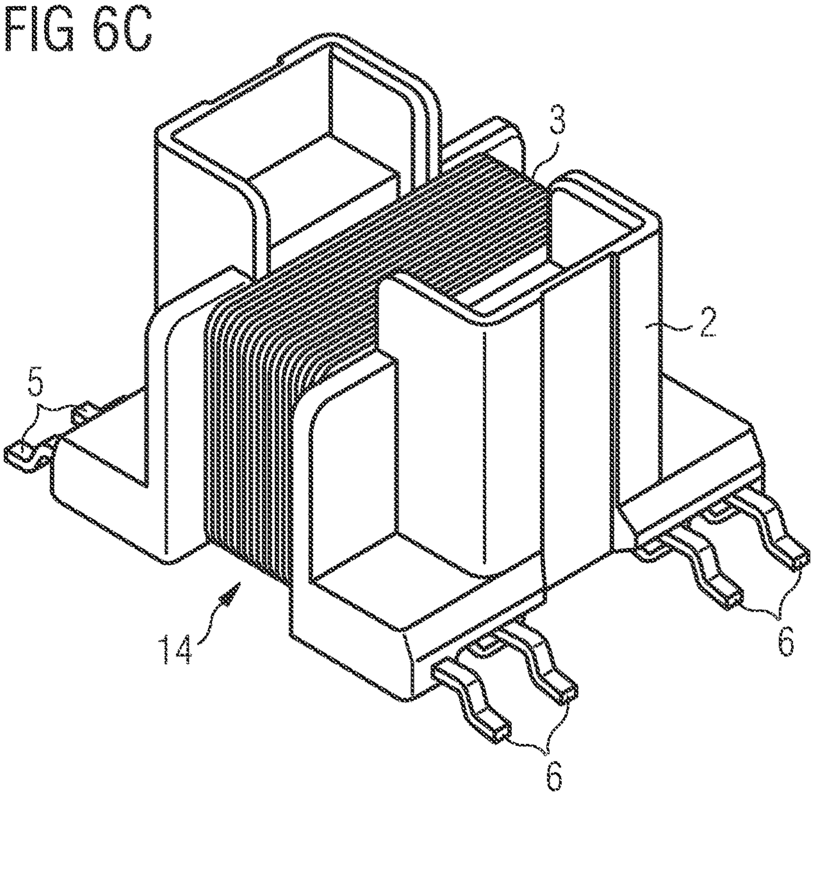
Figure 6D:
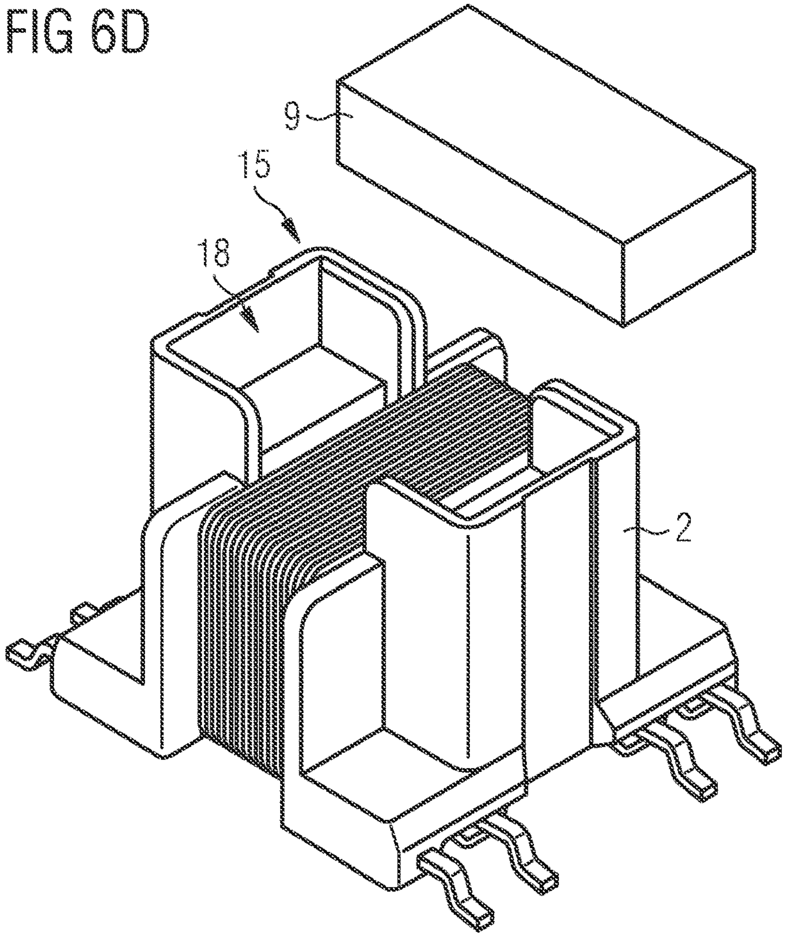
Figure 6E:
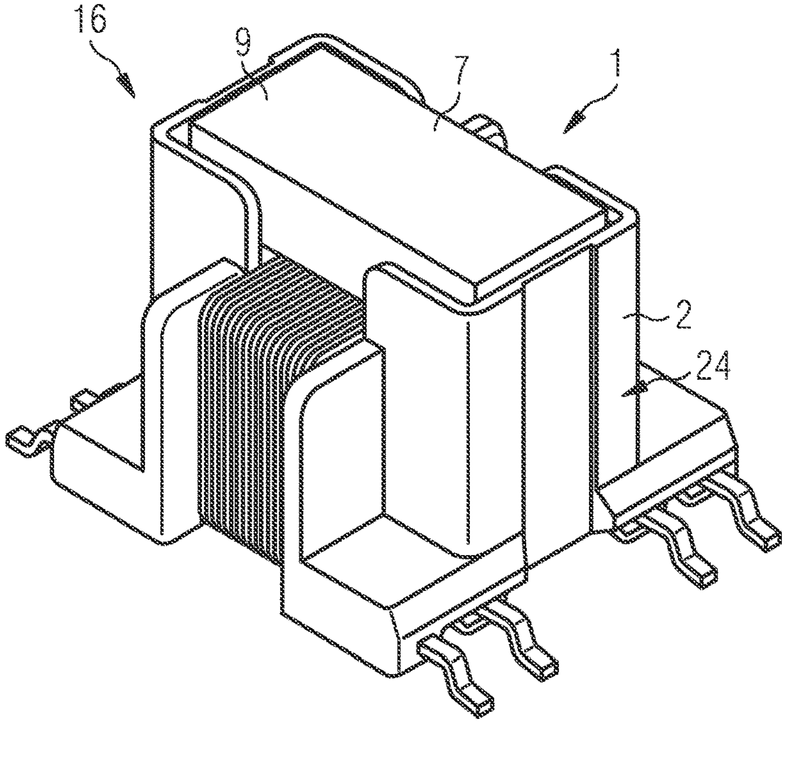
Figure 7:
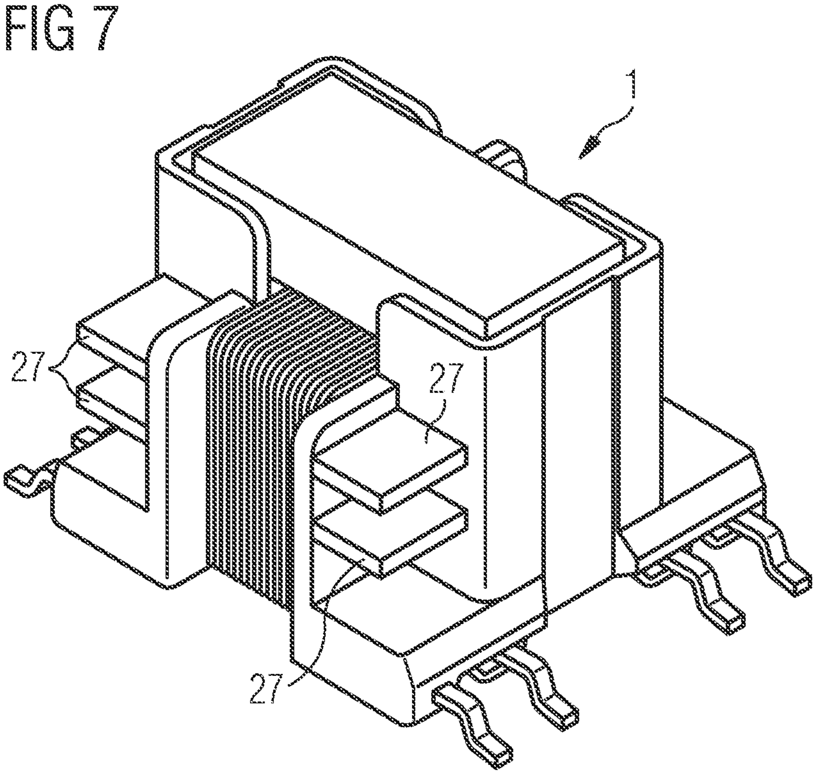

They show:

FIG. 1A an embodiment of a device in sectional view,

FIG. 1B the device from FIG. 1A in a view diagonally from top,

FIG. 1C the device of FIG. 1A in a view diagonally from bottom,

FIG. 2 a further embodiment of a device in a view diagonally from top,

FIG. 3A an embodiment of a winding carrier in a view diagonally from top,

FIG. 3B the winding carrier from FIG. 3A in longitudinal sectional view, FIG. 4A a further embodiment of a device in a lateral view from diagonally above, FIG. 4B the device of FIG. 4A in another lateral view diagonally from top, FIG. 4C the device of FIG. 4A in a view diagonally from bottom, FIG. 4D the device of FIG. 4A in a view from the top, FIG. 5 a further embodiment of a device in a lateral view diagonally from top, FIGS. 6A to 6E method steps for producing the component of the device of FIG. 5, FIG. 7 a further embodiment of a device in a lateral view diagonally from top.

Preferably, in the following figures, the same reference signs refer to functionally or structurally corresponding parts of the various embodiments.

FIG. 1A shows an embodiment of a device 1 in a longitudinal section. FIG. 1B shows the device 1 in a view diagonally from top, FIG. 1C shows the device 1 in a view diagonally from bottom.

The device 1 is configured, for example, as a transformer. The device 1 may also be configured as a device with a different functionality, in particular a device in which the maintenance of insulation paths between electrical terminals is of particular importance.

The device 1 comprises a winding carrier 2 around which at least one winding 3 of a wire 4 is wound. The winding 3 is arranged here in upright form, i.e., the winding axis is arranged perpendicular to a lower side 14 of the device 1. The lower side 14 corresponds to a mounting side of the device 1, for example in the case of fixation to a printed circuit board. The winding carrier 2 is formed of an electrically insulating material. The winding carrier 2 is also formed, for example, in a non-magnetic manner. The winding carrier 2 may be formed of a plastic material. For example, the winding carrier 2 is produced by an injection molding process.

A plurality of windings may be applied around the winding carrier 2, in particular one or more primary-side windings and one or more secondary-side windings of a transformer. Where reference is made here to one winding, this also applies accordingly to several windings. The winding carrier 2 comprises flange-shaped boundaries 10, 11 on both sides, between which the winding 3 is arranged.

The wire 4 comprises a metallic material, for example copper. The wire 4 is sheathed with an insulation, for example a triple insulation (TIW—"triple insulated wire"). Thus, the wire 4 or the winding 3 do not have to be separately covered or additionally insulated.

The device 1 comprises at least a first terminal 5 and a second terminal 6. The terminals 5, 6 are attached directly to the winding carrier 2, for example co-injection molded when manufacturing the winding carrier 2 in an injection molding process. The wire ends of the windings 3 are connected with the terminals 5, 6. Presently, a plurality of first terminals 5 are arranged in a row and a plurality of second terminals 6 are arranged in a row. The first terminals 5 and the second terminals 6 are arranged on opposite side faces 16, 24 of the device 1.

In this regard, all of the first terminals 5 may be primary-side terminals, i.e., power-supply-side terminals, and all of the second terminals 6 may be secondary-side terminals, i.e., consumer-side terminals. For example, the first terminals 5 are for connection to a supply network and the second terminals 6 are for connection to a consumer, e.g., a refrigerator. For example, each of two of the first terminals 5 are connected to a first, primary-side winding and two of the second terminals 6 are connected to a secondary-side winding.

The device 1 comprises a magnetic core 7. The core 7 comprises, for example, a ferrite material or another magnetic material. The core 7 is not itself formed as a winding carrier, but is a separate element attached to the winding carrier 2. The core 7 also differs in its material from the winding carrier 2. In particular, the core 7 comprises a greater electrical conductivity than the winding carrier 2.

In the present case, the core 7 is made of several parts. A first core part 8 comprises an I-shape. A second core part 9 comprises a U-shape. The core parts 8, 9 can also comprise another shape, for example both core parts 8, 9 can be U-shaped. The core parts 8, 9 together form a closed magnetic circuit. The core parts 8, 9 are glued to each other, for example.

A magnetic core 7 usually comprises a higher electrical conductivity than the winding carrier 2 and can lead to electrical bridging of insulation paths between the first and second terminals 5, 6. Thus, the core 7 does not contribute to an insulation path between the first and second terminals 5, 6, so that insulation clearances must be observed separately from the core 7.

An insulation path 28 between the first and second terminals 5, 6 is here in particular the shortest creepage distance between the terminals 5, 6 along a surface of the component 1 and/or the shortest clearance distance between the terminals 5, 6. For such insulation paths a minimum length, for example according to IEC standard, must be observed. In the case of a plurality of first terminals 5 and a plurality of second terminals 6, the insulation path is the shortest of the insulation paths between all first terminals 5 and all second terminals 6. In other words, the conditions for spacing and insulation paths mentioned herein may apply to any pair of first terminals 5 and second terminals 6.

In FIG. 1B, a first insulation path 12 is illustrated between the core 7 and the first terminals 5. In addition, a second insulation path 13, in particular a shortest air gap, is depicted between the core 7 and the second terminals 6.

The insulation path between the first and second terminals 5, 6 along the upper side 15 of the device is herein the sum of the first and second insulation paths 12, 13.

In FIG. 1C, the device 1 is illustrated with a view on its lower side 14. The winding carrier 2 is closed at the bottom. In particular, there are no cutouts on the lower side 14 through which the core 7 protrudes out of the winding carrier 2 or through which the core 7 can be pushed into the winding carrier 2. The core 7 is thus insulated on the lower side 14 in the region between the first and second terminals 5, 6 by the winding carrier 2. The arrangement of the core 7 inside the winding carrier 2 ensures space-saving insulation. The core 7 protrudes only laterally out of the winding carrier 2.

At least in a region of the lower side 14 which is laterally bounded by the first and second terminals 5, 6, the winding carrier 2 does not comprise a cutout through which the core 7 is exposed.

In this way, an insulation path 28 between the second terminals 6 along the lower side 14 is not bridged by the core 7. As can be seen, an insulation path 29 from the second terminals 6 to the core 7 is increased by the encasing by the insulating winding carrier 2. Thus, the core 7 is partially insulated from the outside by the winding carrier 2 such that the minimum creepage or clearance distance between the first and second terminals 5, 6 along the lower side 14 of the device 1 does not comprise a bridging by the core. Thus, the core 7 does not bridge and shorten the insulation paths between the terminals 5, 6.

Thus, at the lower side 14, the core 7 does not influence the insulation path 28 between the terminals 5, 6, so that the size of the device 1 can be reduced. In particular, at the lower side 14 the distance d of the first terminals 5 from the second terminals 6 can be minimized to the minimum insulation distance. It is only necessary to ensure that along the upper side 15 the required minimum insulation distance is maintained even in a bridging by the core 7.

In particular, the core 7 is encased by the winding carrier 2 in such a way that the sum of the insulation path 12 between the first terminals 5 and the core 7 and the insulation path 13 between the second terminals 6 and the core 7 is at least as large as the geometric distance between the first terminal 5 and the second terminal 6.

On the lower side, the winding carrier also comprises recesses 23 through which the insulation paths 29 between the second terminals 6 and the core 7 can be prolonged.

The core 7 protrudes out of the winding carrier 2 only at a side face 16 of the winding carrier 2. In particular, the winding carrier 2 comprises at a side face 16 a first opening 17 (see FIGS. 3A, 3B) through which the core 7 protrudes out of the winding carrier 2. In addition, the winding carrier 2 comprises at its upper side 15 a second opening 18 (see FIGS. 3A, 3*b*) through which the core 7 protrudes out of the winding carrier 2.

The core 7 protrudes into the first opening 17, leads through the winding carrier 2 through a lead-through 19 and leads out of the winding carrier 2 through the second opening 18. The lead-through 19 (see FIGS. 3A, 3B) extends in a first region 30 along the winding axis and in a second region 31 parallel to the lower side 14. Inside the lead-through 19, i.e. from the first opening 17 to the second opening 18, the core 7 is enclosed by the winding carrier 2 without interruption.

In the embodiment of FIGS. 1A, 1B, 1C, the core 7 is arranged and insulated asymmetrically with respect to the winding carrier 2 and the terminals 5, 6. Thus, the insulation path 12 between the core 7 and the first terminals 5 is small, but the insulation path 13 between the core 7 and the second terminals 6 is considerably larger.

The first core part 8 is I-shaped, and the second core part 9 is U-shaped. The I-shaped first core part 8 is arranged parallel to the lower side 14. The U-shaped, second core part 8 is arranged with a leg along the winding axis. In other embodiments, an I-shaped, first core part may be arranged along the winding axis and a U-shaped, second core part may be arranged with its legs parallel to the lower side. It is also possible for both core parts 8, 9 to be U-shaped, for example.

In the following, a method for producing the device 1 is described.

Therein, the winding carrier 2 is provided and a winding 3 is applied to the winding carrier 2. For this purpose, for example, a winding mandrel (not shown here) is inserted into the first opening 17 (see FIGS. 3A, 3B). After applying the winding 3, the winding mandrel is removed and the I-shaped first core part 8 is inserted laterally into the first opening 17. Subsequently, the U-shaped second core part 9 is inserted from the upper side 15 into the second opening 18 (see FIGS. 3A, 3B). The first and second core parts 8, 9 can be glued together.

FIG. 2 shows a further embodiment of a device 1. In contrast to the embodiment described above, the device 1 comprises two first terminals 5 on a first side face 15 and four second terminals 6 on a second side face 24.

The first terminals 5 are configured, for example, for connection to a supply network and the second terminals 6 are configured for connection to a consumer. The first terminals 5 are connected, for example, to a first winding 3 and the second terminals 6 are connected in pairs to two further windings 20. The first winding 3 is arranged, for example, above the second windings 20 in the direction of the winding axis. The second windings 20 are located, for example, at the same position one above the other relative to the winding axis. Since the winding wires are insulated from the outside, the windings 3, 20 can also be arranged differently, for example all at the same position relative to the winding axis.

The invention is not limited to the shown number and arrangement of first and second terminals and windings. For example, there may also be only two first terminals and two second terminals and two windings.

Also in the embodiment shown, the lower side 14 of the winding carrier 2 is completely closed, so that in order to maintain the minimum insulation path at the lower side 14 of the device 1, it is sufficient to select the distance between opposite terminals 5, 6 equal to the minimum insulation path.

In addition, the winding carrier 2 comprises protrusions on its upper side 15 by which creepage and clearance distances between core 7 and second terminals 6 along the upper side 15 are increased. A first protrusion 21 extends a region of the winding carrier 2 upwardly. A second protrusion 22 extends the winding carrier 2 towards one side. Both protrusions 21, 22 are selected in such a way that they do not increase the outer dimensions of the device 1.

FIG. 3A shows an embodiment of a winding carrier 2 diagonally from a top. FIG. 3B shows the winding carrier 2 in longitudinal section. The winding carrier 2 is essentially configured as the winding carrier 2 of FIG. 2, except that it does not comprise the additional projections 21, 22.

The winding carrier 2 comprises a first opening 17 on a side face 16 and a second opening 18 on its upper side 15. In the sectional view of FIG. 3B, the lead-through 19 can be seen. The lead-through 19 comprises a first region 30 running parallel to the winding axis (vertical in this case) and a second region 31 running perpendicular to the winding axis. The second region 31 runs parallel to the lower side 14. The lead-through 19 is configured overall L-shaped. The lead-through 19 is completely encased by the winding carrier 2 and is thus only accessible from the outside at the openings 17, 18.

FIG. 4A shows an embodiment of a device 1 in a side view diagonally from the top. FIG. 4B shows the device from another side view diagonally from the top. FIG. 4C shows the device in a view diagonally from the bottom. FIG. 4D shows the device in a top view.

For reasons of clearness, the device 1 is shown without winding. The winding is applied directly around the winding carrier 2 in the finished device 1. In contrast to the preceding embodiments, the winding axis runs parallel to the lower side 14 of the device 1. The winding carrier 2 comprises two flange-shaped boundaries 10, 11, which bound the winding on both sides.

First and second terminals 5, 6 are provided directly on the winding carrier 2. In the present case, there are only two first terminals 5 and two second terminals 6.

Also here, the core 7 comprises a first core part 8 in I-shape and a second core part 9 in U-shape (see FIG. 4B). The first core part 8 is arranged in the winding carrier 2 along the horizontal winding axis.

The winding carrier 2 completely encases the core 7 at the lower side 14. The lower region of the core 7, in this case formed by the I-shaped core part 8, is encased by the winding carrier 2 almost from all sides. Only the region of the I-shaped core part 8 directed towards a further side face 24 lies open. Towards the first side face 16, the core 7 is completely insulated from the winding carrier 2 towards the outside. Thus, no core area is visible from a view on the lower side 14 and in a view on the side surface 16. Overall, large regions of the core 7 are built into the winding carrier 2 and thus are arranged to be hidden and insulated from the terminals 5, 6.

Thus, also here, the insulation path between the first and second terminals 5, 6 along the lower side 14 of the device 1 is not bridged by the core 7. Depending on the geometry of the device 1, the insulation path, i.e., the minimum creepage or clearance distance, between the first and second terminals 5, 6 runs along the lower side 14 of the device 1 or along the side faces 16, 24. Here, too, the sum of the insulation path between the first terminals 5 and the core 7 and the insulation path between the second terminals 6 and the core 7 is at least as great as the geometric distance d between the first and second terminals 5, 6.

The distance d between the first terminals 5 and the second terminals 6 can thus be selected to be equal to the minimum insulation distance. As can be easily seen in FIG. 4D, the first and second terminals 5, 6 are offset inwardly. In particular, the regions of the winding carrier 2 in which the terminals 5, 6 are anchored are further inward than the regions which laterally encase the core 7. Thus, the winding carrier 2 is configured stepped at the side faces 16, 24.

This allows a further reduction in size of the component 1 without violating the required minimum insulation distance. This reduction in size is made possible by the insulation of the core 7 with respect to the terminals 5, 6 by the winding carrier 2.

In the following, a method for producing the device 1 is described.

Therein, the winding carrier 2 is provided and a winding is applied to the winding carrier 2 (not shown here). For this purpose, for example, a winding mandrel (not shown here) is inserted into a first opening 17 (FIG. 4B). After applying the winding, the winding mandrel is removed and the I-shaped first core part 8 is inserted into the first opening 17. Then, the U-shaped second core part 9 is inserted into the second opening 18 from the upper side 15. The first and second core parts 8, 9 may be glued to each other.

In another embodiment, for example, the I-shaped core part may also be inserted into an opening at the left end of the upper side and the U-shaped core part may be inserted laterally. The invention is also not limited to I-shaped and U-shaped core parts.

FIG. 5 shows a further embodiment of a device 1. FIGS. 6A to 6E show a method for producing the device, thereby also illustrating the internal structure of the device 1 of FIG. 5.

As in the embodiments described above, the winding carrier 2 also forms a housing for the core 7 in order to insulate the core 7 from first and/or second terminals 5, 6. The winding carrier 2 encases the core 7 from the lower side 14 such that no region of the core 7 is exposed between the terminals 5, 6. As in the embodiment according to FIGS. 4A to 4D, the core 7 is fully encased at the lower side 14 so that no region of the core 7 is exposed.

The core 7 also here comprises a first core part 8 (FIG. 5) and a second core part 9 (FIG. 6A). The first core part 8 is U-shaped, the second core part 9 is I-shaped.

In contrast to the preceding embodiments, the core 7 is completely, i.e. both core parts 8, 9 (core part 8 see FIG. 6A), inserted into the winding carrier 2 from an upper side 15. In particular, the winding carrier 2 comprises an opening 18 only on the upper side 15 for insertion of both core parts 8, 9. At the side faces 16, 24, the core 7 is completely encased by the housing 2. The housing 2 also extends partially over the two further side faces 25, 26. The lower core part 8 is not visible from the outside. The upper core part 9 is only visible from the top.

Thus, the core 7 is similarly insulated from the first and second terminals 5, 6. In particular, the insulation path between the first terminals 5 and the core 7 is of the same length as the insulation path between the second terminals 6 and the core 7. Overall, there is a symmetrical apportionment of the insulation paths between the core 7 and the first terminals 5 and between the core 7 and the second terminals 6.

As shown in FIG. 6A, the winding carrier 2 is provided during the manufacturing of the device 1. Terminals 5, 6 are attached to the winding carrier 2. No winding is yet attached to the winding carrier 2. The U-shaped first core part 8 is inserted into the winding carrier 2 through an opening 18 at the upper side 15. In particular, the first core part 8 is inserted into the open winding axis in the winding carrier 2.

FIG. 6B shows the winding carrier 2 with the inserted U-shaped first core part 8. The winding carrier 2 encases the first core part 8 at the lower side 14 and from all side faces 16, 24, 25, 26. Only at the upper side 15 the first core part 8 is exposed. A wire 4 is then wound around the winding carrier 2 and, thus, a winding 3 is applied.

FIG. 6C shows the winding carrier 2 with the winding 3. The winding 3 is arranged horizontally so that the winding axis runs parallel to the lower side 14 of the device 1. Wire ends of the winding 3 are guided through guide grooves in the winding carrier 2 to the terminals 5, 6 and electrically connected with the terminals 5, 6. At the terminals 5, 6, the insulating layer is removed from the wire and the wire is soldered or laser-welded to the respective terminal 5, 6, for example.

As shown in FIG. 6D, a second core part 9 is then inserted into the winding carrier 2 through the opening 18 from the upper side 15. The second core part 9 is I-shaped in the present case. However, it is also possible to use differently shaped core parts 8, 9, for example both core parts 8, 9 as U-cores.

FIG. 6E shows the finished device 1. The first core part 8 forms a closed magnetic circuit with the second core part 9. The first core part 8 is glued to the second core part 9, for example. The second core part 9 is completely encased by the winding carrier 2 at two side faces 16, 24. The winding carrier 2 fits tightly against the core parts 8, 9 and thus defines the position of the core parts 8, 9. Thus, an automatic and well controllable arrangement and gluing of the core parts 8, 9 is possible.

FIG. 7 shows a variant of the device 1 of FIGS. 5 to 6E. Here, the winding carrier 2 comprises lateral retaining devices 27 for securing the winding carrier 2 in a winding machine. The retaining devices 27 comprise webs between which, for example, a two-part spindle can be attached to the winding carrier 2.

In contrast to the embodiments of FIGS. 1A to 4D, in the embodiments of FIGS. 5 to 7 the winding carrier 2 does not comprise an opening through which a spindle can be inserted into the winding axis during the production of the winding. By placing the first core part 8 in the winding carrier 2 before applying the winding, the space is already occupied by the first core part 8.

LIST OF REFERENCE SIGNS

1 device
2 winding carrier
3 winding
4 wire
5 first terminal
6 second terminal
7 core
8 first core part
9 second core part
10 boundary
11 boundary
12 insulation path between first terminal and core
13 insulation path between second terminal and core along side face
14 lower side
15 upper side
16 side face
17 opening on side face
18 opening on upper side
19 lead-through
20 further winding
21 first protrusion
22 second protrusion
23 recess
24 further side face
25 further lateral face
26 further side face
27 retaining device
28 insulation path between first and second terminal
29 insulation path between second terminal and core along lower side
30 first region of lead-through
31 second region of lead-through
d distance

The invention claimed is:

1. A device comprising:
a winding carrier;
at least one winding of a wire arranged around the winding carrier;
a magnetic core;
at least one first electrical terminal; and
at least one second electrical terminal;
wherein the winding carrier encloses the magnetic core at least in regions such that an insulation path between the at least one first electrical terminal and the at least one second electrical terminal along a lower side of the device does not comprise a bridging by the magnetic core,
wherein the winding carrier is formed as a single piece and has a lead-through, the magnetic core being arranged in the lead-through, and
wherein the winding carrier further comprises a first opening at a side face for inserting a first core part and a second opening at an upper side for inserting a second core part, the lead-through being accessible from outside of the device only through the first opening and the second opening.

2. The device according to claim 1,
wherein the magnetic core is encased by the winding carrier such that a sum of a first insulation path between the at least one first electrical terminal and the magnetic core and a second insulation path between the at least one second electrical terminal and the magnetic core is at least as large as the geometric distance between the at least one first electrical terminal and the at least one second electrical terminal.

3. The device according to claim 1,
wherein the device is designed as a transformer, wherein the at least one first electrical terminal is at a primary side and the second at least one second electrical terminal is at a secondary side.

4. The device according to claim 1,
wherein the magnetic core comprises the first core part and the second core part, and wherein one of the first and second core parts is I-shaped and one of the first and second core parts is U-shaped.

5. The device according to claim 1,
wherein the at least one first electrical terminal is arranged at the side face of the winding carrier and the at least one second electrical terminal is arranged at a second side face of the winding carrier, wherein the magnetic core is completely or in a predominant part encased by the winding carrier at least at one of the side face and the second side face.

6. The device according to claim 1,
wherein the lead-through is arranged along a winding axis of the winding carrier.

7. The device according to claim 1,
wherein at least one of the at least one first electrical terminal and the at least one second electrical terminal is arranged set back in a lateral direction.

8. The device according to claim 1,
wherein at least one of the at least one first electrical terminal and the at least one second electrical terminal is arranged on the side face.

9. The device of claim 1,
wherein the winding carrier further comprises a further side face opposite the side face, the magnetic core being completely or in a predominant part encased by the winding carrier at the further side face.

10. The device according to claim 1, wherein a winding axis of the at least one winding is arranged parallel to the lower side of the device.

11. A method for manufacturing a device, comprising the steps of:
providing a winding carrier that is formed as a single piece and has a lead-through, wherein the winding carrier further comprises a first opening at a side face for inserting a first core part and a second opening at an upper side for inserting a second core part, and wherein the lead-through is accessible from outside of the device only through the first opening and the second opening;
inserting the first core part into the first opening; and
inserting the second core part into the second opening.

12. The method according to claim 11, wherein the inserting the first core part occurs prior to the inserting the second core part.

13. The method according to claim 11, wherein the inserting the second core part occurs prior to the inserting the first core part.

14. The method according to claim 11, wherein the device comprises at least one winding of a wire arranged around the winding carrier, wherein a winding axis of the at least one winding is arranged parallel to a lower side of the device.

15. A device comprising:

a winding carrier; and at least one winding of a wire arranged around the winding carrier;

a magnetic core;

at least one first electrical terminal; and at least one second electrical terminal;

wherein the winding carrier comprises a lower side, the at least one first electrical terminal and the at least one second electrical terminal arranged opposite to each other with respect to the lower side, the winding carrier lacking a cutout through which the core is exposed at least in a region of the lower side which is laterally bounded by the at least one first electrical terminal and the at least one second electrical terminal, wherein the winding carrier is formed as a single piece and has a lead-through, the magnetic core being arranged in the lead-through, and wherein the winding carrier further comprises a first opening at a side face for inserting a first core part and a second opening at an upper side for inserting a second core part, the lead-through being accessible from outside of the device only through the first opening and the second opening.

16. The device according to claim 15, wherein a winding axis of the at least one winding is arranged parallel to the lower side of the device.

17. A device comprising:

a winding carrier formed as a single piece, the winding carrier having two side faces opposite each other, an upper side, a first opening and a second opening;

at least one winding of a wire arranged around the winding carrier;

a magnetic core having a first core part and a second core part;

at least one first electrical terminal; and at least one second electrical terminal;

wherein the winding carrier encloses the magnetic core at least in regions such that an insulation path between the at least one first electrical terminal and the at least one second electrical terminal along a lower side of the device does not comprise a bridging by the magnetic core, wherein the first opening is arranged at a first one of the two side faces for inserting the first core part in the winding carrier, the second opening is arranged at the upper side for inserting the second core part in the winding carrier, and wherein the magnetic core is completely or in a predominant part encased by the winding carrier at a second one of the two side faces.

18. The device according to claim 17 wherein the device comprises at least one winding of a wire arranged around the winding carrier, wherein a winding axis of the at least one winding is arranged parallel to the lower side of the device.

* * * * *